United States Patent [19]

Takada

[11] Patent Number: 4,913,372

[45] Date of Patent: Apr. 3, 1990

[54] SEAT BELT RETRACTOR

[76] Inventor: Juichiro Takada, No. 12-1, Shinmachi 3-Chome, Setagaya-Ku, Tokyo, Japan

[21] Appl. No.: 350,005

[22] Filed: May 10, 1989

[51] Int. Cl.$^4$ .............................................. B60R 22/44
[52] U.S. Cl. .................................................... 242/107
[58] Field of Search ......... 242/107, 107.4 R, 107.4 A, 242/107.4 B; 280/806, 807; 297/475, 478, 480

[56] References Cited

U.S. PATENT DOCUMENTS

| | | | |
|---|---|---|---|
| 4,534,520 | 8/1985 | Yanagihara | 242/107 |
| 4,711,408 | 12/1987 | Mori | 242/107 |
| 4,809,925 | 3/1989 | Takada | 242/107 |

Primary Examiner—John M. Jillions

Attorney, Agent, or Firm—Brumbaugh, Graves, Donohue & Raymond

[57] ABSTRACT

A seat belt retractor comprises a main winding spring coupled between the frame and the reel shaft and an auxiliary winding spring coupled between the frame and a rotatable clutch wheel. A clutch-operating mechanism locks the clutch wheel against rotation when the belt is done up, thereby inactivating the auxiliary spring. The clutch wheel is coupled to the shaft by an elongated flexible coupling member wound spirally around a portion of the reel shaft such that it tightens when the reel shaft rotates in the belt-unwinding direction relative to the clutch wheel and loosens when the reel shaft rotates in the belt-winding direction relative to the clutch wheel.

1 Claim, 5 Drawing Sheets

SEAT BELT RETRACTOR

BACKGROUND OF THE INVENTION

Many designs for vehicle seat belt retractors having a belt-winding mechanism that applies a relatively high rotational force to the belt reel when the belt is undone and a relatively low rotational force to the reel when the belt is connected to the buckle have been proposed in recent years. These designs are intended to overcome the problem of imparting a sufficient rotational force to the reel to wind the belt into it without pulling the belt against the vehicle occupant when it is buckled up for use so firmly as to be bothersome or even uncomfortable. These retractors usually have two winding springs coupled between the reel and the frame and a mechanism for deactivating one of the springs when the belt is done up to the buckle.

In U.S. Pat. No. 4,809,925 (Mar. 7, 1989) for "Seat Belt Retractor" (the subject matter of which was published in counterpart U.K. Patent Application GB No. 2 195 232, Apr. 7, 1988 and German Application DE OS No. 37 32 465, May 5, 1988) the present inventor has described and shown a seat belt retractor having a winding mechanism comprising a main winding spring coupled between the reel and frame, a clutch wheel rotatably carried by the reel shaft, and an auxiliary winding spring coupled between the frame and the clutch wheel. A lost-motion mechanism interposed between the clutch wheel and the reel shaft allows a predetermined amount of rotation of the reel shaft relative to the clutch wheel but couples the reel shaft to the clutch wheel at one end of the lost motion so that the forces of the two springs act in parallel to wind the belt onto the reel. The lost-motion mechanism allows the slack in the belt to be taken up when the auxiliary spring is deactivated and allows the belt to be pulled out when the occupant leans forward. The clutch wheel is locked against rotation in the belt-winding direction by a clutch-engaging mechanism composed of a lever and pawl operated by an electromagnetic solenoid that is energized when a switch in the buckle is closed upon insertion of the buckle tongue on the belt into the buckle.

The retractor described above has been found to perform entirely satisfactorily and reliably. On the other hand, it has been observed that the mechanical lost-motion mechanism, which consists of gears and a locking pawl, is noisy, and the noise it makes, especially when the belt is undone and the lost motion is taken up by winding of the auxiliary spring, can be disconcerting to the vehicle occupant. The gear noise and the noise of the impact of the pawl with the gear wheel abutment are, accordingly, undesirable.

French published patent application No. 2,478,471 (published Sept. 25, 1981) describes and shows a seat belt retractor having a tension-reduction mechanism in which a series of clutch discs act between the reel shaft and a clutch wheel to provide a lost-motion coupling between them. As many as five collisions may occur as the lost-motion is taken up when the tension-relief mechanism is deactivated, and bothersome noise can be expected.

SUMMARY OF THE INVENTION

An object of the present invention is to eliminate the noise problem with the retractor of U.S. Pat. No. 4,809,925 while retaining the advantages of simplicity of construction, low cost, and effective and reliable operation. There is provided, according to the invention, a seat belt retractor similar in all respects to that of U.S. Pat. No. 4,809,925 except that the noisy mechanical clutch is eliminated. The invention is characterized in that the lost-motion coupling between the reel shaft and the clutch wheel is an elongated flexible coupling member spirally wound around a portion of the reel shaft and having one end connected to the reel shaft and the other end connected to the clutch wheel. The coupling member is wound in a direction such that it tightens when the reel shaft rotates in the belt-unwinding direction relative to the clutch wheel and loosens when the reel shaft rotates in the belt-winding direction relative to the clutch wheel.

In addition to eliminating the noise problem, the invention simplifies the retractor by eliminating the clutch gear wheel, idler gear and pawl components. The assembly procedure is correspondingly made easier.

For a better understanding of the invention, reference may be made to the following description of an exemplary embodiment, taken in conjunction with the accompanying drawings.

DESCRIPTION OF THE DRAWINGS

4A, 4B and 4C are diagrammatic views of the two winding springs and the coupling member, respectively.

DESCRIPTION OF THE EMBODIMENT

Figure 1:
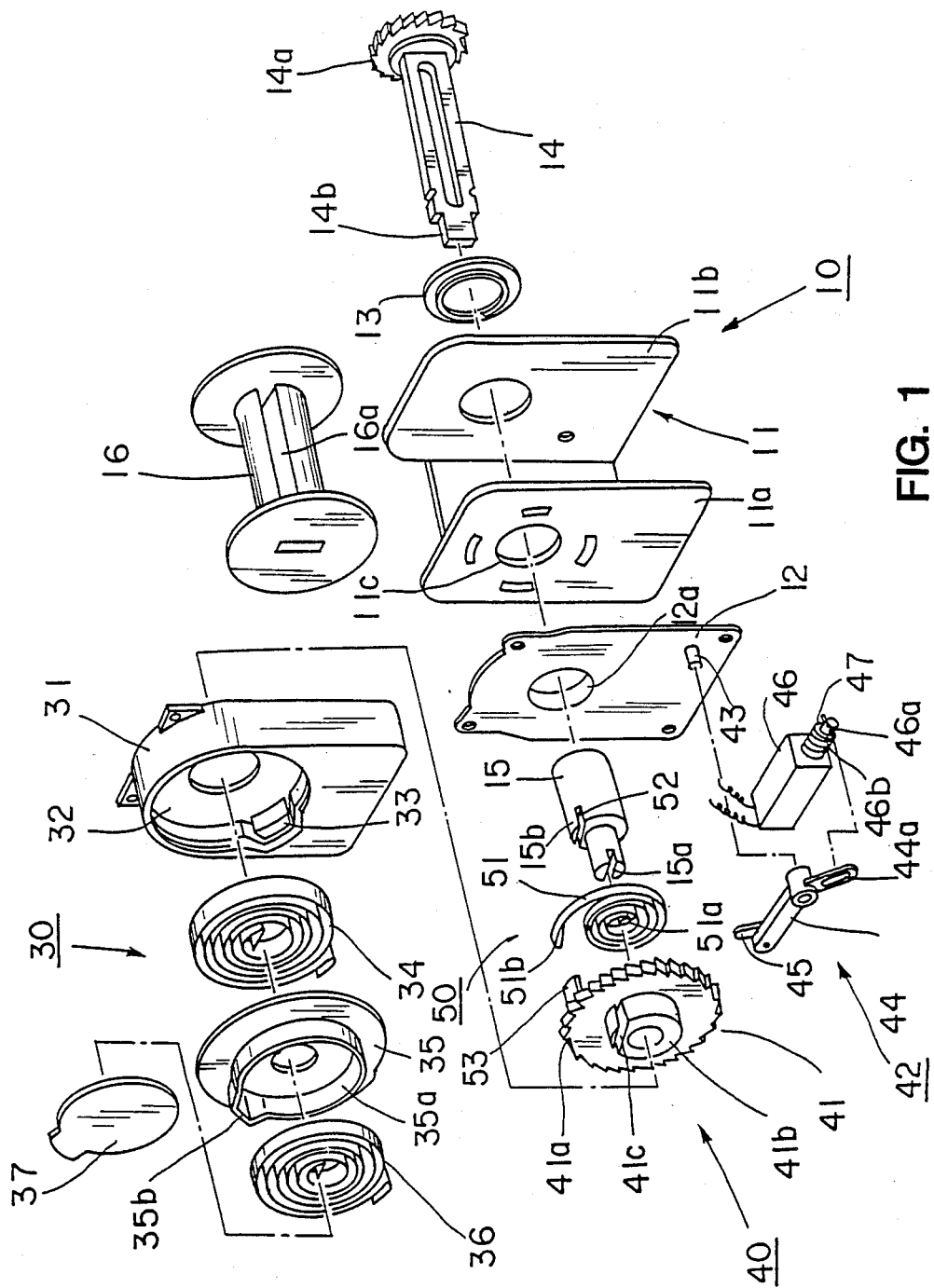
FIG. 1 is an exploded pictorial view of the embodiment.

The frame and reel assembly 10 of the retractor includes a U-shaped frame 11 having a pair of side wall portions 11a and 11b and a retainer 12 attached to the left side wall 11a with an opening 11c formed in the left side wall 11a of the frame 11 used as the standard coupling point. A bushing 13 is fitted in the opening formed in the right side wall 11b of the frame 11. The main reel shaft 14 passes through the bushing 13 and a bushing portion 12a in the retainer 12. A ratchet wheel 14a for an emergency locking device (not shown) is formed at the right end of the shaft 14. A coupling shaft 15 is coupled to a square shaft end portion 14b formed at the left end of the main shaft 14 so that the coupling shaft and main shaft rotate together. A belt reel 16 fits onto the main shaft 14 between the side walls 11a and 11b of the frame 11, and the end of a belt B (FIGS. 2 and 3) is fixed by a belt holder 16a formed at the core of the belt reel 16. At the left end of the coupling shaft 15 is a groove 15a which receives the internal end of the main winding spring 36, as mentioned below.

A detection system 20 (shown schematically in FIG. 2) comprises the tongue (not shown) attached to the seat belt B, the buckle (not shown) to which the tongue is attached to do up the belt, and an appropriate circuit 21 which detects when the buckle and tongue are connected. When the tongue is inserted into the buckle, it engages and closes a switch 22 installed in the buckle, and an electrical signal indicative of connection of the tongue to the buckle is output from the circuit 21.

A mechanism 30 for driving the belt reel in the winding direction comprises a cover 31 attached, together with the retainer 12, to the side wall 11a of the frame 11. A chamber 32 at the left side of the cover 31 receives an auxiliary spiral winding spring 34, the outward end of which is engaged with the stopper 33 provided within the chamber 32. A second housing 35 covers the chamber 32 and has a second chamber 35a at the left side thereof. The main spring 36, the external end of which is engaged with a stopper 35b provided within the second chamber 35a is received in the chamber 35a. A cover 37 covers the second chamber 35a.

The auxiliary spring 34 is fixed at its inner end to a stopper 41c of the clutch wheel 41 so that it biasses the clutch wheel 41 rotationally in the beltwinding direction. The main spring 36 is fixed at its inner end to a groove 15a in the coupling shaft 15 so that it biasses the belt reel 16 in the belt-winding direction.

Figure 2:
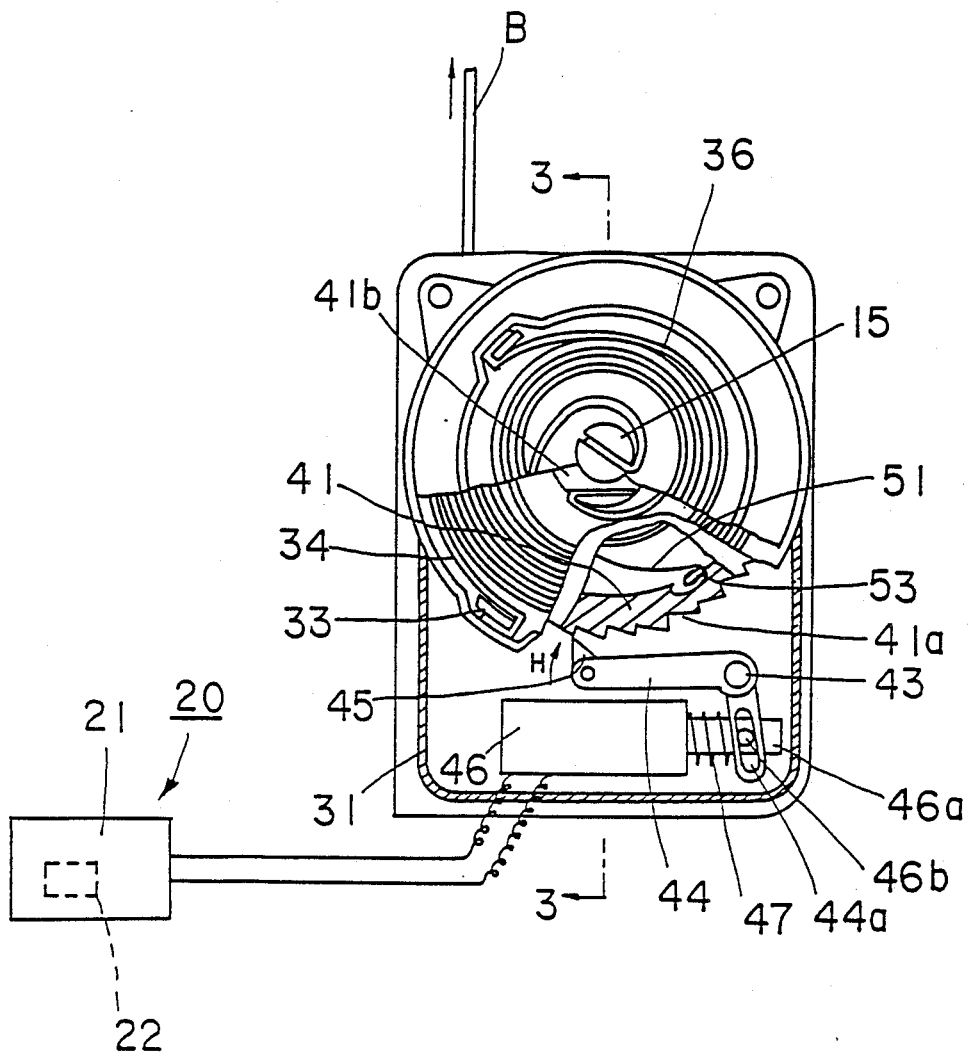
FIG. 2 is a side elevational view of the embodiment, with the cover removed and portions broken away.
Figure 3:
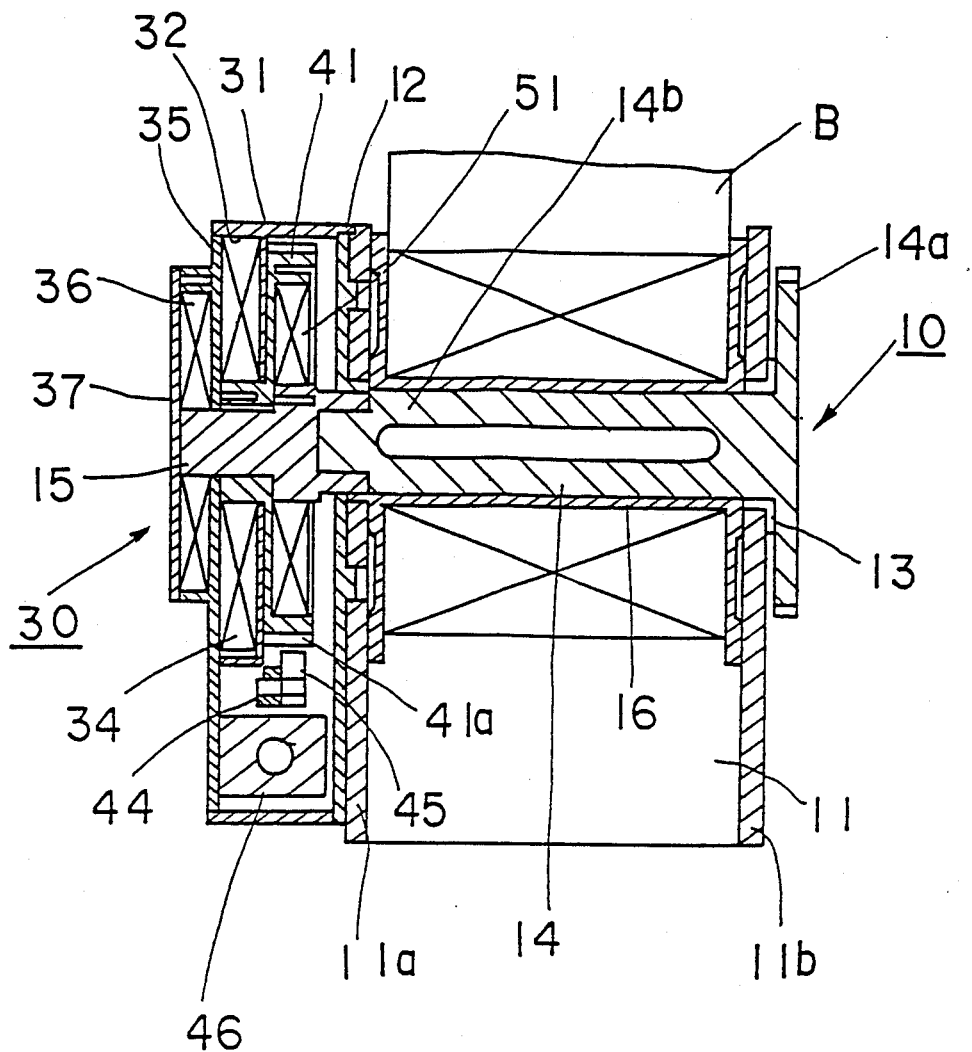
FIG. 3 is a cross-sectional view taken along the axis of the reel shaft, as indicated by the lines 3—3 in FIG. 2.

The clutch wheel 41 is part of a clutch mechanism 40 that deactivates the auxiliary spring 34 (i.e., prevents the auxiliary spring from rotating the clutch wheel) when the belt B is connected to the buckle. The clutch wheel 41 is rotatably mounted on the reduced diameter end part of the coupling shaft 15. When the seat belt buckle tongue is connected to the buckle and the electrical signal is output from the device 20 (FIG. 2), an electromagnetic solenoid 46 is energized, thereby pulling the solenoid plunger 46a to the left in FIG. 2. A coupling pin 46b on the plunger 46a works against a cam slot 44a in one arm of a lever 44 that is pivotably mounted on a pivot pin 43 on the retainer 12. A pawl 45 that is mounted on the end of the lever 44 so that it can pivot only counterclockwise engages a ratchet tooth 41a on the circumference of the clutch wheel 41 when the lever 44 is pivoted in the direction of the arrow H upon energization of the solenoid 46, so that when the pawl 45 engages a tooth 41a the clutch wheel 41 is stopped from rotating in the belt-winding (counterclockwise) direction under the bias of the auxiliary spring 34. On the other hand the ratchet teeth 41a allow the clutch wheel 41 to rotate in the belt-unwinding direction when the belt is pulled out (as explained below), the pawl 45 pivoting counterclockwise against a biassing spring (not shown), even though the solenoid is energized and the lever 44 pivoted into a position to engage the pawl 45 with the clutch wheel. When the solenoid 46 is de-energized, a return spring 47 pushes the plunger to the right, thereby pivoting the lever 44 counterclockwise so that the pawl 45 can no longer engage the teeth 41a of the clutch wheel 41. The clutch-engaging mechanism 42 (elements 43 to 47) is mounted between the housing 31 and the retainer 12 below the belt-winding mechanism (FIGS. 2 and 3).

The clutch mechanism 40 is coupled to the coupling shaft 15 by a lost-motion coupling 50. The coupling 50 is a tape 51 that is wound into a spiral around the larger diameter portion 52 of the coupling shaft 15. A loop 51a on the inner end of the tape 51 is attached to a lug 15b on the shaft 15, and a loop 51b on the outer end is attached to a lug 53 projecting from the clutch wheel 41. The tape 51 should be made of a flexible material having a high tensile strength and small elongation. For example, films of polymeric materials, such as nylon, polyesters and acetals, can be used.

Figure 4A:
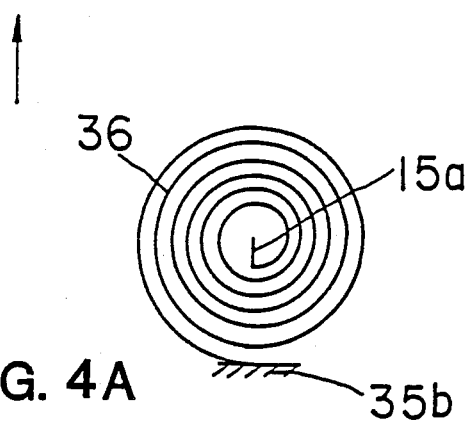
Figure 4B:
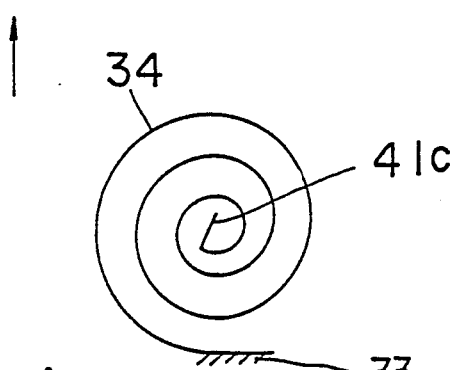
Figure 4C:
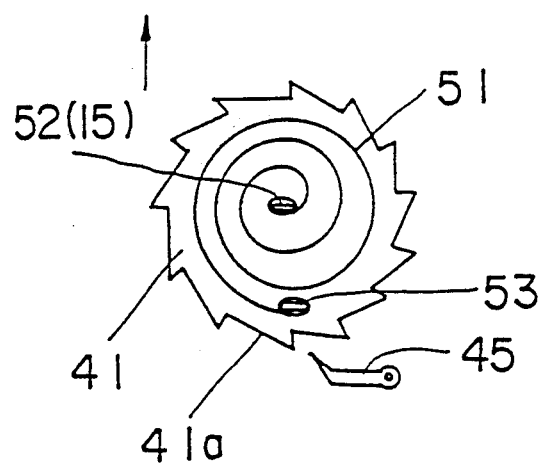

Some of the arrangements of the components will now be explained in relation to the belt pull-out direction (indicated by the arrows in FIGS. 4A through 4C). (a) The main spring 36 is so arranged as to be tightened when the coupling shaft 15 rotate clockwise to draw out the belt. (b) The auxiliary spring 34 is so arranged as to be tightened when the clutch gear 41 rotates clockwise. (c) The tape 51 is so arranged as to be tightened only when the coupling shaft 15 and the clutch gear 41 turn in the opposite directions relative to each other, e.g., when the clutch wheel 41 is at rest while the coupling shaft 15 alone rotates clockwise. (d) When the clutch pawl 45 engages a tooth 41a of the clutch wheel 41, the clutch wheel 41 can rotate clockwise but is prevented from rotating counterclockwise.

Next, the operation of the embodiment of the present invention having the above-described construction will be explained below.

[Winding of the Belt onto the Reel]

Figure 5A:
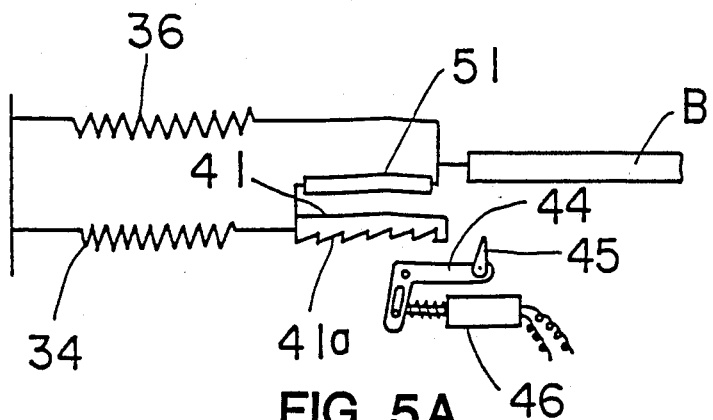
FIGS. 5A, 5B and 5C are diagrams of a linear analogy of the winding mechanism according to the embodiment at different stages in its operation.

The coupling shaft 15, which is always biassed by the main spring 36 in the belt-winding direction, rotates counterclockwise by the driving force of the main spring 36 and causes the belt reel 16 to rotate in the same direction via the main shaft 14 so that the seat belt B, when it is uncoupled from the buckle member, is wound onto the belt reel 16. Also, the electromagnetic solenoid 46 is deenergized, and the plunger 46a is pushed out under the urging of the return spring 47. The clutch pawl 45 of the pivot lever 44, under these conditions, is held in a position where it does not contact the teeth 41a of the clutch wheel 41. As a result the clutch gear 41 rotates counterclockwise under the driving force of the auxiliary spring 34 and takes up any slack in the tape 51 in the course of this rotation. Accordingly, the tape 51 becomes tightly wound round the external surface of the coupling shaft 15 and becomes tensioned between the coupling shaft 15 and the holder 53 on the clutch wheel 41. As a result, the driving force of the auxiliary spring 34 in the belt-winding direction is applied to the coupling shaft 15 via the tape 51, as diagrammatically shown in FIG. 5A. The belt is, therefore, wound onto the reel under the combined forces of the main spring and the auxiliary spring, which act in parallel.

[Withdrawing the Belt for Use]

When the passenger pulls out the belt B to do it up, the belt reel 16, the main shaft 14 and the coupling shaft 15 (hereinafter also called "the main shaft 14, etc.") rotate in the belt-unwinding direction (clockwise), tightening the main spring 36 via the engagement groove 15a of the coupling shaft 15 and, at the same time, tightening the auxiliary spring 34 via the tensioned tape 51. This tightening action can conceptually be illustrated in that it corresponds to the result of pulling the seat belt B rightwards under the conditions in FIG. 5A; i.e., the seat belt B is drawn out against the driving force of both springs 34 and 36, the tape 51 being tensioned to transmit the pull-out force on the belt from the shaft 14, etc., to the clutch wheel 41.

[Passenger Connects Belt to Buckle]

Figure 5B:
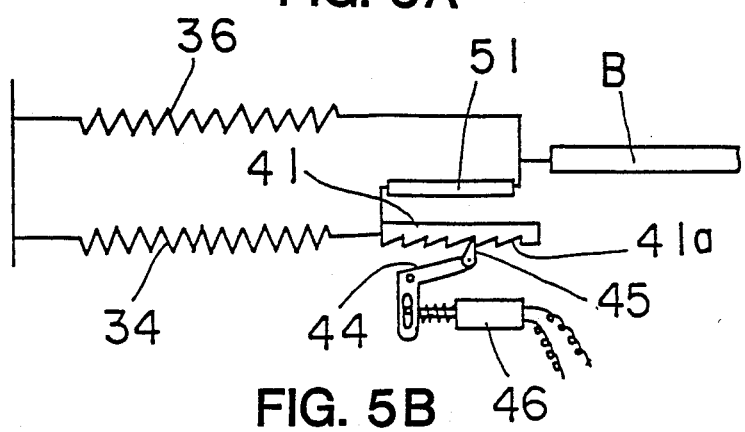

When the passenger couples the tongue of the drawn-out seat belt B to the buckle, the switch 22 within the buckle is closed to energize the electromagnetic solenoid 46, sucking the plunger 46a in and rotating the pivot lever 44 in the direction of the arrow H in FIG. 2. As a result, the clutch pawl 45 engages a tooth 41a of the clutch wheel 41, locks the clutch wheel 41 against rotation in the belt-winding direction, and keeps the driving force of the auxiliary spring 34 in the belt-winding direction inert (deactivates the spring 34), which conditions are illustrated in FIG. 5B.

[Passenger Lets Go of Belt After Connecting it to Buckle]

When the passenger couples the tongue of the seat belt B to the buckle, he must naturally manipulate the belt by drawing out a greater length than that necessary to be normally applied to his body. Therefore, when he lets go of the belt after coupling the tongue to the buckle, the belt is rewound by the driving force of the main spring 36 alone until the belt fits to his body. The driving force of the auxiliary spring 34 in the belt-winding direction is not applied to the shaft 14, etc., because the clutch wheel 41 is locked against rotation in the belt-winding direction.

Figure 5C:
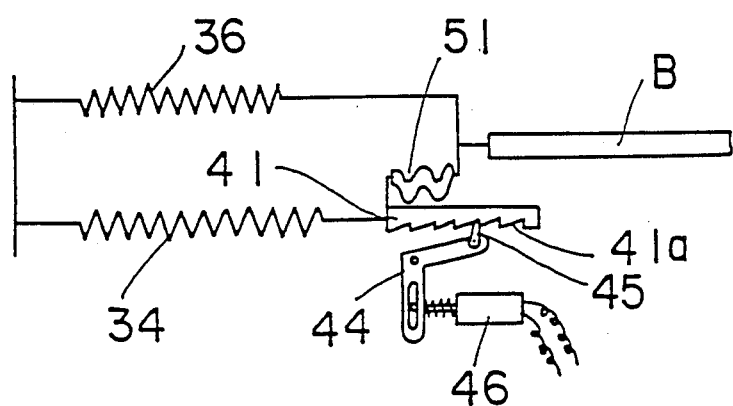

When the belt B was pulled out, the tape 51 was tensioned between the clutch gear 41 and the coupling shaft 15 and wrapped around the shaft 15. When the shaft rotates to take up the slack in the belt, the main shaft 14, etc. rotate counterclockwise by the driving force of the main spring 36 alone, which conditions are shown diagrammatically in FIG. 5C. Rotation of the shaft 14, etc., counterclockwise, relative to the stationary clutch wheel 41, loosens the windings of the tape 51 around the shaft 15. Because the auxiliary spring 34 is deactivated, and the pressure applied to the passenger's body is only that resulting from the force of the main spring 36, the belt causes no discomfort to the passenger.

[Passenger Leans Forward]

When the passenger leans forward from a normal seated position, the belt B is drawn out, which tightens only the main spring 36 until the extra length of the belt which was unwound at the time that the belt was buckled up has been drawn out. When that extra length of the belt has been drawn out, the tape 51 is wound onto the shaft 15 and becomes tensioned between the clutch wheel 41 and the shaft 15; in other words, the lost motion between the shaft 15 and the clutch wheel 41 is taken up. This tension now rotates the clutch wheel 41 clockwise. The ratchet teeth 41a of the clutch wheel 41 can move past the clutch pawl 45, which yields and does not prevent the clutch gear 41 from rotation. As a result, if the seat belt B is drawn out beyond that extra length (the lost motion created when the slack in the belt was taken up after the belt was buckled), the belt B is drawn out, tightening both the auxiliary and main springs 34 and 36.

[The Passenger Returns to a Normal Seated Position]

When the passenger returns to his normal seated position after leaning forward, the seat belt B is wound back only by the driving force of the main spring 36 for the same reason as explained above in connection with the taking up of slack in the belt after it was buckled up, because the teeth ratchet 41a of the clutch wheel 41 oppose the clutch pawl 45 under these circumstances and prevent the rotation of the clutch wheel 41 in the belt-winding direction (counterclockwise).

[Passenger Uncouples the Tongue from the Buckle]

When the tongue of the seat belt B is uncoupled from the buckle, the switch 22 within the buckle opens and the electromagnetic solenoid 46 is denenergized. As a result, the plunger 46a returns under the pressure of the return spring 47 to the extended position, rotating the pivot lever 44 counterclockwise (opposite to the arrow H in FIG. 2) and releasing the engagement between the ratchet teeth 41a of the clutch wheel 41 and the clutch pawl 45. Accordingly, the clutch wheel 41 rapidly rotates in the belt-winding direction (counterclockwise) under the force of the auxiliary spring 34 and wraps the tape 51 into the tensioned state. The seat belt retractor of prior art produced a bothersome noise at this stage of operation (i.e., recovery of the lost-motion in the gear train coupling the clutch wheel to the shaft). By contrast a seat belt retractor according to this invention is so constructed as to accommodate lost motion between the shaft 14, etc., and the clutch wheel 41 by the tensioning and loosening of a spiral-wound, flexible member (the tape 5) provided between the coupling shaft 15 and the clutch gear 41. Such tightening and loosening of the tape is virtually noiseless, and the occurrence of mechanical noise has been eliminated.

An embodiment of this invention has been described, but this invention is not limited to it and can be modified in various ways without departing from the scope of this invention according to the claim. For instance, the clutch mechanism can, needless to say, be constructed by any other appropriate means in place of the structure shown in the accompanying drawings. Furthermore, the means to detect the coupled and uncoupled conditions of the tongue and the buckle may also serve as the detection means in an alarm circuit to inform the passenger of the proper connection of the tongue to the buckle.

The present invention provides, therefore, a reliably operative belt retractor which has sufficient belt-winding force to ensure winding of the belt and yet does not give the passenger any sense of unnecessarily large pressure when the belt is normally applied to his body. The retractor does not produce any bothersome mechanical noise when the lost motion between the reel and the clutch for deactivating the auxiliary spring is created (slackening of the tape) and recovered (tightening of the tape).

I claim:

1. A seat belt retractor having a belt reel rotatably supported in a frame by a reel shaft, a main winding spring coupled between the frame on the reel shaft and biassing the shaft in the belt-winding direction, a clutch wheel rotatably received on the reel shaft, an auxiliary winding spring coupled between the frame and the clutch wheel and biassing the clutch wheel in the belt-winding direction, clutch-operating means for preventing rotation of the clutch wheel in the belt-winding direction when the belt is connected to a buckle, and lost-motion coupling means interposed between clutch wheel and the reel shaft for coupling the clutch wheel to the reel shaft upon a selected amount of rotation of the reel shaft relative to the clutch wheel in the belt-unwinding direction while permitting rotation of the reel shaft relative to the clutch wheel in the belt-winding direction under the bias of the main spring when the ratchet wheel is prevented from rotating in the belt-winding direction, characterized in that the lost-motion coupling means is an elongated flexible coupling member spirally wound around a portion of the reel shaft and having one end connected to the reel shaft and the other end connected to the clutch wheel, the coupling member being wound in a direction to tighten when the reel shaft rotates in the belt-unwinding direction relative to the clutch wheel and to loosen when the reel shaft rotates in the belt-winding direction relative to the clutch wheel.

* * * * *